(12) United States Patent
Sigamani et al.

(10) Patent No.: US 11,749,433 B2
(45) Date of Patent: Sep. 5, 2023

(54) TRANSFORMERS HAVING INTEGRATED MAGNETIC STRUCTURES FOR POWER CONVERTERS

(71) Applicant: Astec International Limited, Kowloon (HK)

(72) Inventors: James Sigamani, Pasig (PH); Jonathan Ross Bernardo Fauni, Quezon (PH)

(73) Assignee: Astec International Limited, Kowloon (HK)

( * ) Notice: Subject to any disclaimer, the term of this patent is extended or adjusted under 35 U.S.C. 154(b) by 593 days.

(21) Appl. No.: 16/293,275

(22) Filed: Mar. 5, 2019

(65) Prior Publication Data
US 2020/0286670 A1  Sep. 10, 2020

(51) Int. Cl.
*H01F 27/24* (2006.01)
*H01F 3/14* (2006.01)
*H01F 27/28* (2006.01)
*H02M 3/335* (2006.01)
*H02M 1/00* (2006.01)
*H02M 3/00* (2006.01)

(52) U.S. Cl.
CPC ............ *H01F 3/14* (2013.01); *H01F 27/24* (2013.01); *H01F 27/28* (2013.01); *H02M 1/0043* (2021.05); *H02M 3/01* (2021.05); *H02M 3/33571* (2021.05); *H02M 3/33576* (2013.01); *H02M 3/003* (2021.05)

(58) Field of Classification Search
CPC . H01F 27/28; H01F 27/24; H01F 3/14; H01F 30/12; H01F 27/38; H02M 3/33576; H02M 1/0058; H02M 3/337; H02M 3/33569; H02M 1/00; Y02B 70/10
See application file for complete search history.

(56) References Cited

U.S. PATENT DOCUMENTS 4,488,136 A    12/1984  Hansen et al.
4,766,365 A *   8/1988  Bolduc .................. G05F 3/06
                                              174/DIG. 17

(Continued)

FOREIGN PATENT DOCUMENTS

EP    2299580 A2    3/2011

OTHER PUBLICATIONS

"Introduction to Electrical Engineering", ESO 210, Three Phase Transformers, 25 pages.

(Continued)

*Primary Examiner* — Mang Tin Bik Lian

(57) ABSTRACT

A transformer includes a magnetic structure and a set of coils. The magnetic structure includes a top member, a bottom member, and a plurality of legs extending between the top member and the bottom member. The plurality of legs include two outer legs. The set of coils is wound about the two outer legs of the magnetic structure and electrically coupled in series. In other examples, the magnetic structure includes a middle member positioned between the top member and the bottom and extending between the two outer legs. In such examples, a second set of coils is wound about the two outer legs of the magnetic structure and electrically coupled in series. Other example transformers and power converters such as multiphase interleaved power converters having transformers are also disclosed.

12 Claims, 9 Drawing Sheets

(56) References Cited

U.S. PATENT DOCUMENTS

| | | | | |
|---|---|---|---|---|
| 4,864,478 | A * | 9/1989 | Bloom | H01F 3/10 336/215 |
| 5,208,739 | A * | 5/1993 | Sturgeon | H02M 3/337 363/24 |
| 5,355,296 | A | 10/1994 | Kuo et al. | |
| 5,426,409 | A * | 6/1995 | Johnson | H01F 21/08 336/170 |
| 5,555,494 | A * | 9/1996 | Morris | H02M 3/33573 363/17 |
| 6,362,986 | B1 | 3/2002 | Schultz et al. | |
| 7,142,081 | B1 | 11/2006 | Shudarek | |
| 7,598,839 | B1 | 10/2009 | Wedley | |
| 7,609,536 | B2 * | 10/2009 | Brochu | H02M 7/08 323/255 |
| 8,885,371 | B2 | 11/2014 | Markowski et al. | |
| 9,165,707 | B2 | 10/2015 | Kippley et al. | |
| 9,257,910 | B2 * | 2/2016 | Lindberg-Poulsen | H02M 3/335 |
| 10,163,562 | B2 * | 12/2018 | Fu | H02M 7/493 |
| 2005/0270745 | A1 | 12/2005 | Chen et al. | |
| 2007/0046415 | A1 * | 3/2007 | Wadlington | H01F 30/12 336/212 |
| 2008/0298093 | A1 | 12/2008 | Jin et al. | |
| 2010/0067263 | A1 * | 3/2010 | Qian | H02M 3/285 363/21.12 |
| 2010/0103585 | A1 * | 4/2010 | Mao | H01F 27/28 361/270 |
| 2010/0164674 | A1 * | 7/2010 | Wu | H01F 38/10 336/221 |
| 2011/0248812 | A1 * | 10/2011 | Hu | H01F 29/14 336/221 |
| 2012/0049993 | A1 | 3/2012 | Han et al. | |
| 2013/0082814 | A1 | 4/2013 | Markowski et al. | |
| 2013/0201728 | A1 * | 8/2013 | Njiende | H02M 3/335 363/21.04 |
| 2013/0343091 | A1 * | 12/2013 | Njiende T. | H02M 3/01 336/170 |
| 2014/0022037 | A1 | 1/2014 | Huang et al. | |
| 2014/0241012 | A1 * | 8/2014 | Lindberg-Poulsen | H02M 3/33553 363/17 |
| 2014/0268907 | A1 | 9/2014 | Cinagrossi et al. | |
| 2014/0340940 | A1 * | 11/2014 | Ouyang | H01F 30/06 336/170 |
| 2015/0092455 | A1 * | 4/2015 | Won | H02M 3/33507 363/21.12 |
| 2015/0287512 | A1 * | 10/2015 | Winkler | H01F 37/00 336/212 |
| 2016/0020016 | A1 | 1/2016 | Ouyang et al. | |
| 2017/0263369 | A1 * | 9/2017 | Gold | H01F 27/324 |
| 2017/0323717 | A1 * | 11/2017 | Dimitrovski | H01F 27/33 |
| 2018/0040416 | A1 * | 2/2018 | Lestoquoy | H01F 27/38 |
| 2018/0061560 | A1 * | 3/2018 | Wukovits | H02M 3/24 |
| 2018/0323720 | A1 * | 11/2018 | Njiende | H01F 27/38 |
| 2018/0350513 | A1 * | 12/2018 | Murakami | H02M 3/01 |

OTHER PUBLICATIONS

Sen et al. "A High Efficient Integrated Planar Transformer for Primary-Parallel Isolated Boost Converters", 2010, pp. 4605-4610.

Zhang et al., "1 MHz-1 kW LLC Resonant Converter with Integrated Magnetics", 2007, pp. 955-961.

Martinez et al., "Three-phase LLC Resonant Converter with Integrated Magnetics", 2017.

"Single Phase, Three Phase Transformers", Canada Transformers Inc., retrieved Feb. 26, 2016, 3 pages.

* cited by examiner

TRANSFORMERS HAVING INTEGRATED MAGNETIC STRUCTURES FOR POWER CONVERTERS

FIELD

The present disclosure relates to transformers having integrated magnetic structures for power converters.

BACKGROUND

This section provides background information related to the present disclosure which is not necessarily prior art.

Power converters convert electrical power between inputs and outputs. The power converters sometimes include multiple phases each having a transformer. In such examples, each transformer may include windings and its own core for the windings. In other examples, the windings of multiple transformers may be wound on inner legs of a magnetic core.

SUMMARY

This section provides a general summary of the disclosure, and is not a comprehensive disclosure of its full scope or all of its features.

According to one aspect of the present disclosure, a transformer for a multiphase interleaved power converter includes a magnetic structure, a first set of coils, and a second set of coils. The magnetic structure includes a top member, a bottom member, a plurality of legs extending between the top member and the bottom member, and a middle member positioned between the top member and the bottom. The plurality of legs include two outer legs, and the middle member extends between the two outer legs. The first set of coils is wound about the two outer legs of the magnetic structure and electrically coupled in series. The second set of coils is wound about the two outer legs of the magnetic structure and electrically coupled in series.

According to another aspect of the present disclosure, a transformer includes a magnetic structure and a set of coils. The magnetic structure includes a top member, a bottom member, and a plurality of legs extending between the top member and the bottom member. The plurality of legs include two outer legs. The set of coils is wound about the two outer legs of the magnetic structure and electrically coupled in series.

According to another aspect of the present disclosure, a multiphase interleaved power converter includes a plurality of phases and a transformer for the plurality of phases. The transformer includes a magnetic structure, a first set of coils, and a second set of coils. The magnetic structure includes a top member, a bottom member, a plurality of legs extending between the top member and the bottom member, and a middle member positioned between the top member and the bottom. The plurality of legs include two outer legs, and the middle member extends between the two outer legs. The first set of coils is wound about the two outer legs of the magnetic structure and electrically coupled in series. The second set of coils is wound about the two outer legs of the magnetic structure and electrically coupled in series.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1A:
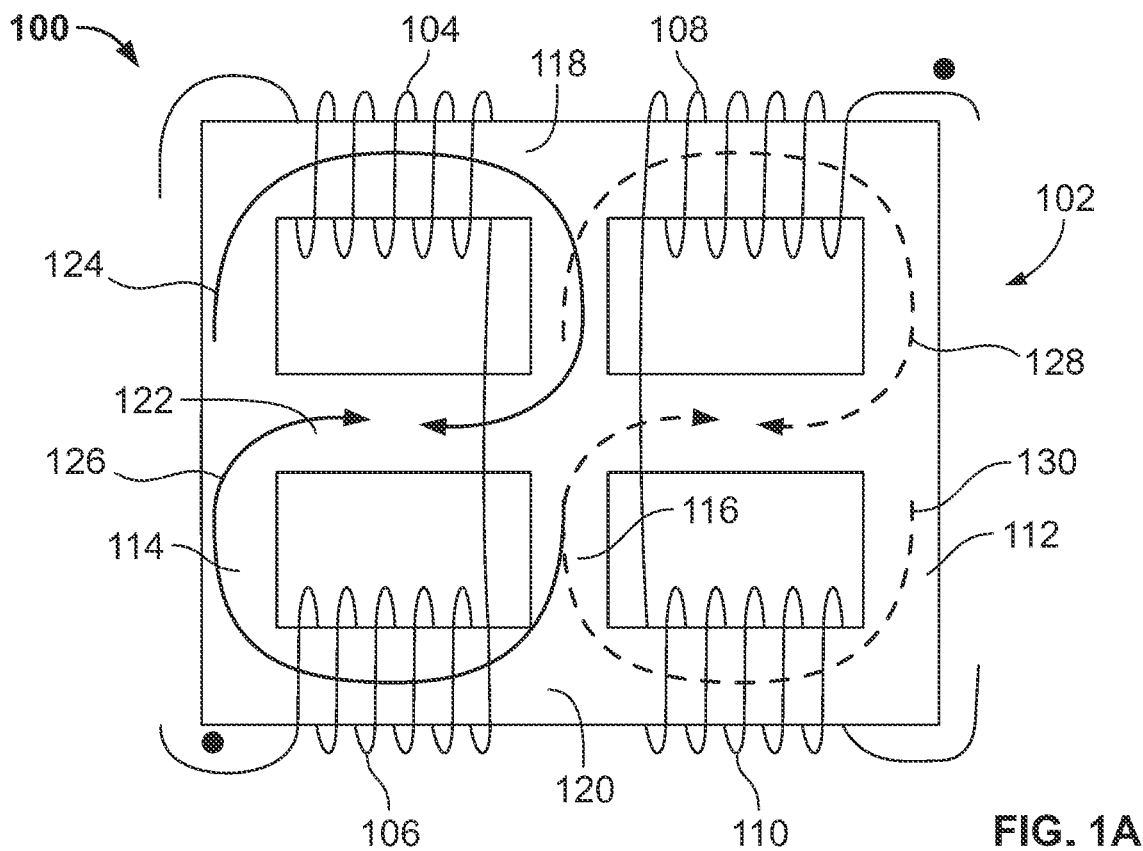
FIG. 1A is a transformer for a multiphase interleaved power converter including a magnetic structure having an E-I-E core configuration, and multiple sets of coils wound about outer legs of the magnetic structure, according to one example embodiment of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

A transformer for a multiphase interleaved power converter according to one example embodiment of the present disclosure is illustrated in FIG. 1A and indicated generally by reference number 100. As shown in FIG. 1A, the transformer 100 includes a magnetic structure 102 and coils 104, 106, 108, 110. The magnetic structure 102 includes a top member 112, a bottom member 114, legs extending between the top member 112 and the bottom member 114, and a middle member 116 positioned between the top member 112 and the bottom member 114. The legs include two outer legs 118, 120, and the middle member 116 extends between the outer legs 118, 120. As shown in FIG. 1A, the coils 104, 106, 108, 110 are wound about the outer legs 118, 120.

As shown in FIG. 1A, the coils 104, 106 are electrically coupled in series and form one set of coils, and the coils 108, 110 are electrically coupled in series and form another set of coils. As such, the same amount of current (e.g., substantially the same amount of current due to losses) flows through the series-coupled coils 104, 106, and the same amount of current (e.g., substantially the same amount of current due to losses) flows through the series-coupled coils 108, 110.

In the particular example of FIG. 1A, the magnetic structure (e.g., a magnetic core) 102 includes a center leg 122 positioned between the two outer legs 118, 120. The center leg 122 may extend between the top member 112 and the bottom member 114. In some embodiments, the center leg 122 is optional and therefore may be removed, as further explained below.

When the magnetic structure 102 includes the center leg 122, magnet flux generated from the coils 104, 106, 108, 110 may be cancelled. For example, when the coils 104, 106 are energized, magnetic flux 124, 126 generated from the coils 104, 106 flows in opposite directions in the center leg 122. As such, when current flowing through the coils 104, 106 is the same, the generated magnetic flux cancels (e.g. completely cancels) in the center leg 122 as explained herein. The same magnetic flux cancellation is true with respect to the coils 108, 110 and the center leg 122. For example, when the coils 108, 110 are energized, magnetic flux 128, 130 generated from the coils 108, 110 flows in opposite directions in the center leg 122.

By cancelling magnetic flux in the center leg 122, the size of the magnetic structure 102 may be reduced as compared to conventional magnetic structure(s) employed in multiphase power converters. In some examples, the volume of the center leg 122 may be neglected in core configuration design and/or reduced in size due to the cancelling magnetic flux. Because of the reduced size of the magnetic structure 102, the power density of a multiphase power converter employing the transformer 100 may be increased and core losses in the multiphase power converter may be decreased as compared to conventional converters. This reduction of core losses may lead to higher efficiency.

In some cases, if complete cancellation of magnetic flux is achieved such that no magnetic flux travels through the center leg 122, the center leg 122 may magnetically decouple portions of the outer legs 118, 120 of the magnetic structure 102. In such examples, one portion of the outer leg 118, one portion of the outer leg 120, and the coils 104, 106 wound about these portions in FIG. 1A may be used for one phase of a multiphase power converter. Likewise, another portion of the outer leg 118, another portion of the outer leg 120, and the coils 108, 110 may be used for another phase of the multiphase power converter.

As explained above, the transformer 100 includes the coils 104, 106, 108, 110 wound about the outer legs 118, 120. In the particular example of FIG. 1A, the coils 104, 106, 108, 110 are wound about only the outer legs 118, 120. As such, the transformer 100 includes no coils wound about the center leg 122 or the middle member 116.

In the particular example of FIG. 1A, the magnetic structure 102 has an E-I-E core configuration. For example, the top member 112 and portions of the outer legs 118, 120 may form one E-shaped core, and the bottom member 114 and portions of the outer legs 118, 120 may form another E-shaped core. The middle member 116 and/or portions of the outer legs 118, 120 and center leg 122 may form an I-shaped core.

In some embodiments, the E-I-E magnetic structure 102 may have a monolithic construction as shown in FIG. 1A. Alternatively, the E-I-E magnetic structure 102 may be formed with multiple members, legs, etc. mechanically coupled to one another (e.g., via adhesives or other suitable means).

Although not shown in FIG. 1A, the magnetic structure 102 may optionally include one or more gaps to physically separate portions of the magnetic structure 102. The gaps may be formed of air and/or another suitable non-magnetic material. The gaps may assist in generating a magnetizing inductance in a multiphase power converter as further explained below.

Figure 1B:
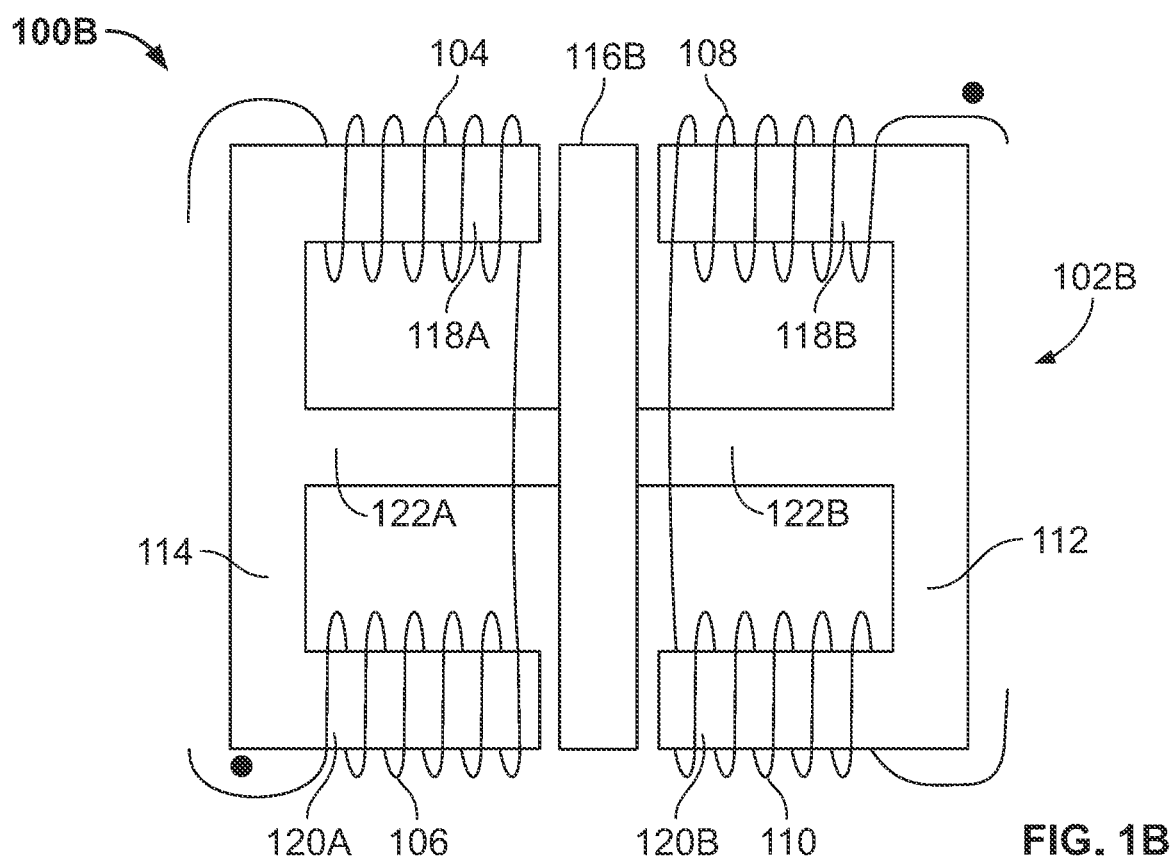
FIG. 1B is a transformer for a multiphase interleaved power converter including a magnetic structure similar to the magnetic structure of FIG. 1A, but including air gaps, according to another example embodiment.

For example, FIG. 1B illustrates a transformer 100B substantially similar to the transformer 100 of FIG. 1A, but including air gaps to physically separate portions of its magnetic structure 102B. For instance, each leg 118, 120, 122 of FIG. 1A may be formed of two or more portions (e.g., legs 118A, 118B, 120A, 120B, 122A, 122B of FIG. 1B) to assist in creating the air gaps. Specifically, the magnetic structure 102B includes the members 112, 114 of FIG. 1A, outer legs 118A, 118B, 120A, 120B extending between the members 112, 114, center legs 122A, 122B extending between the members 112, 114, and a middle member 116B positioned between the members 112, 114. As shown in FIG. 1B, the transformer 100B includes an air gap between each outer leg 118A, 118B, 120A, 120B and the middle member 116B. Placing the air gaps between the outer legs and the middle member 116B maintains the reluctance of the center legs 122A, 122B at a low value. Alternatively, the air gaps may be positioned between the center legs 122A, 122B and the middle member 116B if desired.

As shown in FIG. 1B, the transformer 100B includes the series-coupled coils 104, 106, and the series-coupled coils 108, 110 of FIG. 1A. In the example embodiment of FIG. 1B, the coils 104, 106 are wound about the outer legs 118A, 120A, respectively, and the coils 108, 110 are wound about the outer legs 118B, 120B, respectively. As shown, no coils are wound about the center legs 122A, 122B or the middle member 116B.

The transformers disclosed herein may be employed in power converters such as single-phase power converters or multiphase interleaved power converters. In such examples, the multiphase interleaved power converters may include multiphase interleaved resonant power converters. For instance, the series-coupled coils 104, 106 of FIGS. 1A and 1B may represent transformer windings in one phase of the multiphase interleaved resonant power converter, and the series-coupled coils 108, 110 of FIGS. 1A and 1B may represent transformer windings in another phase of the multiphase interleaved resonant power converter.

Figure 2:
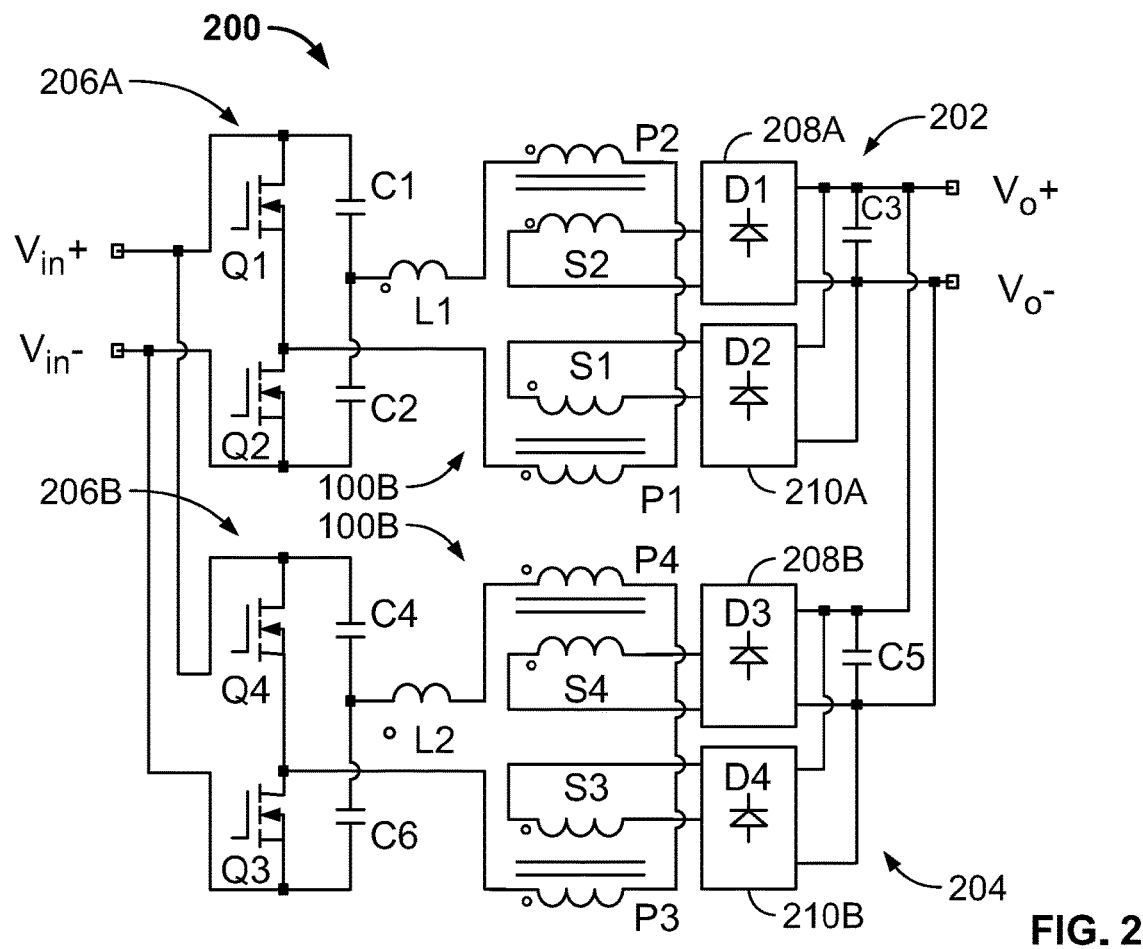
FIG. 2 is a two-phase interleaved LLC power converter where each phase includes primary windings coupled in series according to yet another example embodiment.

For example, FIG. 2 illustrates a two-phase interleaved LLC power converter 200 including the transformer 100B. Although FIG. 2 illustrates the two-phase interleaved LLC power converter 200, other suitable multiphase interleaved power converters may employ the teachings disclosed herein without departing from the scope of the disclosure.

As shown in FIG. 2, the power converter 200 includes an input for receiving an input voltage Vin+, Vin−, an output for providing an output voltage Vo+, Vo−, and two phases 202, 204 coupled between the input and the output. The phases 202, 204 electrically coupled in parallel.

In the particular example of FIG. 2, the phases 202, 204 include the same circuit configuration. For example, the phase 202 includes two series-coupled primary windings P1, P2, two secondary windings S1, S2, a switching circuit 206A coupled between the primary windings P1, P2 and the input, and two switching circuits 208A, 210A coupled between the secondary windings S1, S2 and the output. Likewise, the phase 204 includes two series-coupled primary windings P3, P4, two secondary windings S3, S4, a switching circuit 206B coupled between the primary windings P3, P4 and the input, and two switching circuits 208B, 210B coupled between the secondary windings S3, S4 and the output. As shown, the primary side switching circuits 206A, 206B include two MOSFET power switches Q1, Q2, Q3, Q4 arranged in a half-bridge configuration, and the secondary side switching circuits 208A, 208B, 210A, 210B are rectifying circuits.

In the particular example of FIG. 2, the multiphase interleaved LLC power converter 200 includes the transformer 100B. As such, the coils 104, 106 of FIG. 1B may be equivalent to the primary windings P1, P2, respectively, and the coils 108, 110 of FIG. 1B may be equivalent to the primary windings P3, P4, respectively. In such examples, the magnetic structure 102B of FIG. 1B may be shared between the phases 202, 204. Therefore, in the particular example of FIG. 2, the magnetic structure, the primary windings P1, P2, P3, P4 and the secondary windings S1, S2, S3, S4 form the transformer As shown in FIG. 2, the power converter 200 includes various resonant components. For example, and as shown in FIG. 2, the phases 202, 204 includes capacitors C1, C2, C4, C6 coupled to the switching circuits 206A, 206B, inductors L1, L2 coupled between the capacitors C1, C2, C4, C6 and the primary windings P1, P2, P3, P4, and output filter capacitors C3, C5 coupled across the outputs of the secondary side switching circuits. The capacitors C1, C2, the inductor L1 and a magnetizing inductance generated by the transformer form an LLC resonant tank circuit in the phase 202. Additionally, the capacitors C4, C6, the inductor L2 and the magnetizing inductance generated by the transformer form another LLC resonant tank circuit in the phase 204.

The secondary windings S1, S2, S3, S4 of each phase 202, 204 may be coupled in parallel. For example, in the particular example of FIG. 2, the secondary windings S1, S2 are coupled in parallel via the switching circuits 208A, 210A. Specifically, the secondary windings S1, S2 are coupled separately to inputs of the switching circuits 208A, 210A, respectively. Outputs of the switching circuits 208A, 210A are coupled in parallel. In other examples, the secondary windings S1, S2 may be coupled directly in parallel. The secondary windings S3, S4 of the phase 204 may have a similar configuration with its switching circuits 208B, 210B.

As shown in FIG. 2, each set of the primary windings P1, P2, P3, P4 are coupled in series. For example, one end of the primary winding P1 is coupled between the power switches Q1, Q2 and the other end of the primary winding P1 is coupled to one end of the primary winding P2. The other end of the primary winding P2 is coupled between the capacitors C1, C2 via the resonant inductor L1. The secondary windings P3, P4 of the phase 204 may have a similar configuration with its switching circuit 206A, capacitors C4, C6, and resonant inductor L2. The series-coupled primary windings P1, P2, P3, P4 may assist in current sharing in the parallel-coupled connected secondary windings S1, S2, S3, S4.

Additionally, because each set of the primary windings are coupled in series, the same amount of current passes through the primary windings P1, P2 and the same amount of current passes through the primary windings P3, P4. As such, the same amount of magnetic flux is generated in the magnetic structure from the current passing through the primary windings. In such examples, if the magnetic structure includes a center leg (e.g., 122, 122A, 122B of FIGS. 1A and 1B), complete magnetic flux cancellation may be achieved in the center leg as further explained below.

In other embodiments, one or both sets of series-coupled coils may represent secondary windings. For example, FIG. 3 illustrates one phase 300 of a multiphase interleaved LLC power converter in which a set of coils represent two series-coupled secondary transformer windings.

Figure 3:
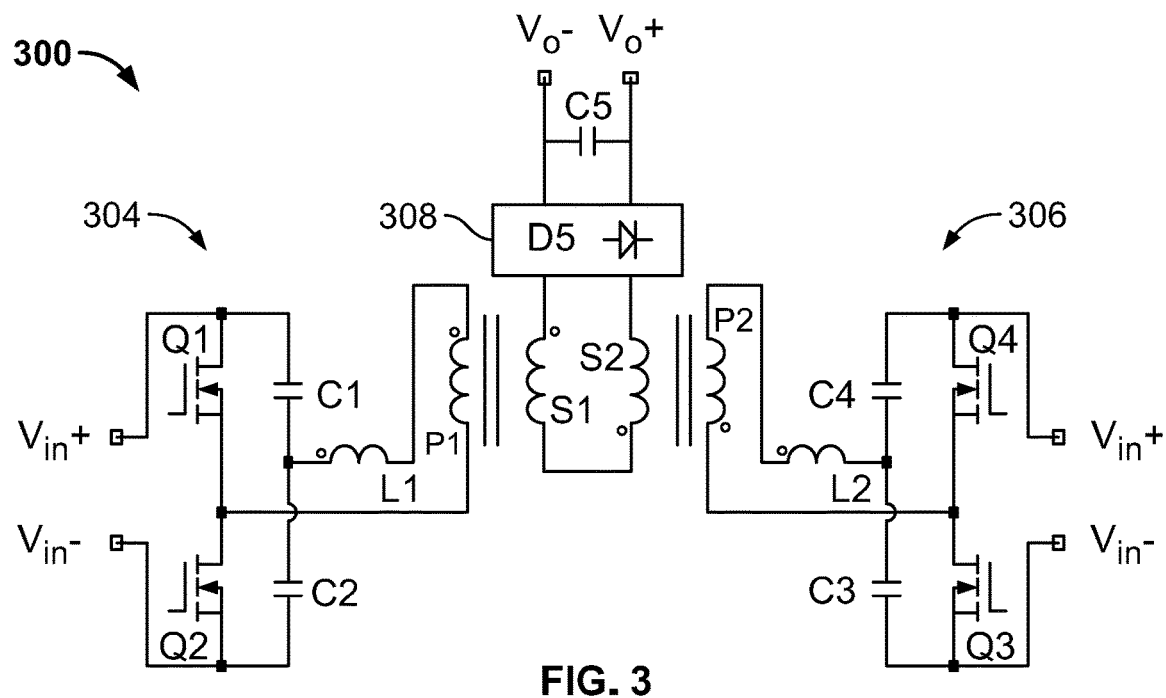
FIG. 3 is a circuit diagram of one phase of a multiphase interleaved LLC power converter including secondary windings coupled in series according to yet another example embodiment.

As shown in FIG. 3, the phase 300 includes an input for receiving an input voltage Vin+, Vin−, an output for providing an output voltage Vo+, Vo−, two primary windings P1, P2, two series-coupled secondary windings S1, S2, and switching circuits 304, 306, 308. The switching circuit 304 is coupled between the primary winding P1 and the input, and the switching circuit 306 is coupled between the primary winding P2 and the input. As shown, the switching circuits 304, 306 receive the same input voltage Vin+, Vin−. As such, inputs of the switching circuits 304, 306 are coupled in parallel. The switching circuit 308 (e.g., a rectifying circuit) is coupled between the secondary windings S1, S2 and the output.

In the particular example of FIG. 3, the primary side switching circuits 304, 306 have half-bridge topographies. For example, the switching circuit 304 includes two MOSFET power switches Q1, Q2 arranged in a half bridge configuration, and the switching circuit 306 includes two MOSFET power switches Q3, Q4 arranged in a half bridge configuration.

In the example of FIG. 3, the multiphase interleaved LLC power converter includes a magnetic structure that is shared between the phase 300 and at least one additional phase (not shown) of the multiphase interleaved LLC power converter. The magnetic structure, the primary and secondary windings P1, P2, S1, S2 of FIG. 3, and primary and secondary windings of the other phase may form a transformer as explained above. In such examples, the primary windings P1, P2 and the secondary windings S1, S2 of FIG. 3 may be wound on one or more portions of the magnetic structure as explained above.

Like the phases 202, 204 of FIG. 2, the phase 300 of FIG. 3 may include various resonant components. For example, and as shown in FIG. 3, the phase 300 includes capacitors C1, C2 coupled to the switching circuit 304, capacitors C3, C4 coupled to the switching circuit 306, an inductor L1 coupled between the capacitors C1, C2 and the primary winding P1, another inductor L2 coupled between the capacitors C3, C4 and the primary winding P2, and an output filter capacitor C5 coupled across the output. The capacitors C1, C2, the inductor L1 and a magnetizing inductance generated by the transformer form one LLC resonant tank circuit. Additionally, the capacitors C3, C4, the inductor L2 and the magnetizing inductance generated by the transformer form another LLC resonant tank circuit.

The primary windings P1, P2 of FIG. 3 may be coupled in parallel. For example, the primary windings P1, P2 may be coupled in parallel via the switching circuits 304, 306 as shown in FIG. 3. For instance, the primary windings P1, P2 are coupled to the switching circuits 304, 306, respectively, and the inputs of the switching circuits 304, 306 are coupled in parallel. In other examples, the primary windings P1, P2 may be coupled directly in parallel.

As explained above, the secondary windings S1, S2 are coupled in series. For example, one end of the secondary winding S1 is coupled to the switching circuit 308 and the other end of the secondary winding S1 is coupled to one end of the secondary winding S2. The other end of the secondary winding S2 is coupled to the switching circuit 308. As such, the same amount of current passes through each secondary winding S1, S2. The series-coupled secondary windings S1, S2 may assist in current sharing of the parallel-connected primary windings P1, P2, and cause complete magnetic flux cancellation as further explained herein.

Figure 4:
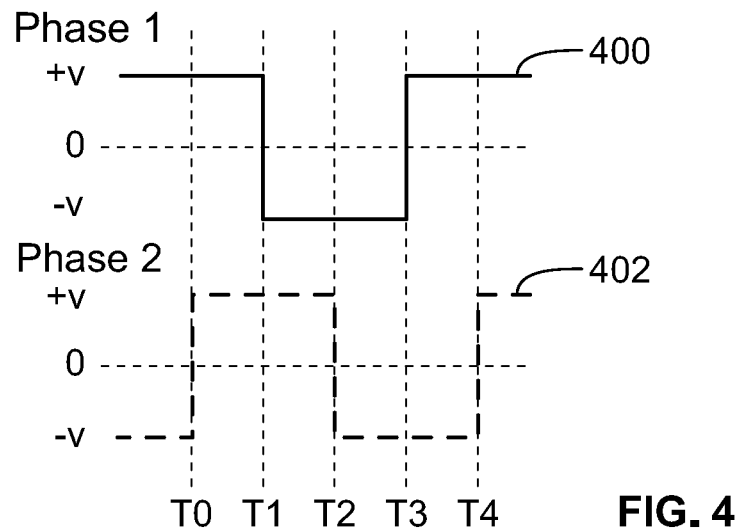
FIG. 4 is a graph showing voltages applied to two sets of primary windings in a two-phase interleaved power converter having a phase shift of ninety degrees according to another example embodiment.
Figure 5:
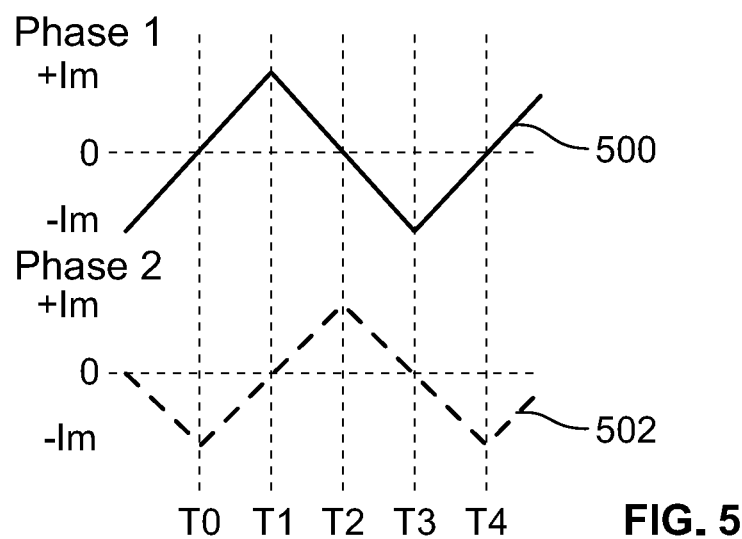
FIG. 5 is a graph showing current flowing through the two sets of primary windings of FIG. 4.
Figure 6:
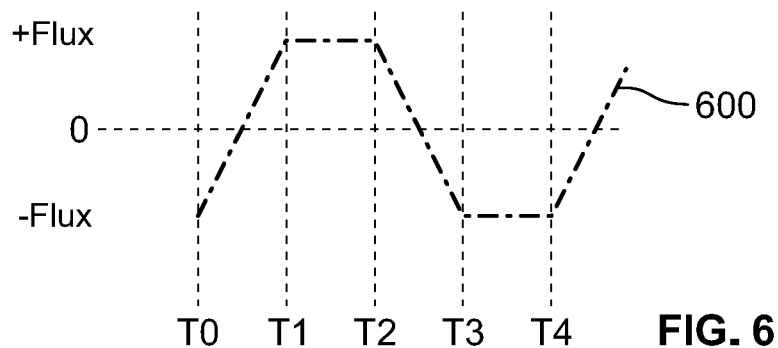
FIG. 6 is a graph showing flux flowing in a portion of a magnetic structure in the two-phase interleaved power converter of FIG. 4.

The interleaved power converters disclosed herein may experience a phase shift between each phase. In some examples, one phase may operate with a ninety (90) degree phase shift, a one hundred eighty (180) degree phase shift, etc. relative to another phase. For example, FIG. 4 illustrate waveforms 400, 402 of phase voltages a phase shift of ninety (90) degree therebetween over time T0 through time T4 (e.g., one period (T)). FIG. 5 illustrates waveforms 500, 502 of currents corresponding to the phase voltages of FIG. 4. Specifically, the waveform 400 of FIG. 4 represents a voltage applied to a set of series-coupled primary windings (e.g., the coils 104, 106 of FIG. 1B) in one phase (Phase 1), and the waveform 402 of FIG. 4 represents a voltage applied to another set of series-coupled primary windings (e.g., the coils 108, 110 of FIG. 1B) in another phase (Phase 2). The waveform 500 of FIG. 5 represents a current flowing through the series-coupled primary windings (e.g., the coils 104, 106 of FIG. 1B) in Phase 1, and the waveform 502 of FIG. 5 represents a current flowing through the series-coupled primary windings (e.g., the coils 108, 110 of FIG. 1B) in Phase 2. FIG. 6 illustrates a waveform 600 of generated flux when the series-coupled primary windings are energized with the current waveforms 500, 502 of FIG. 5.

Figure 7:
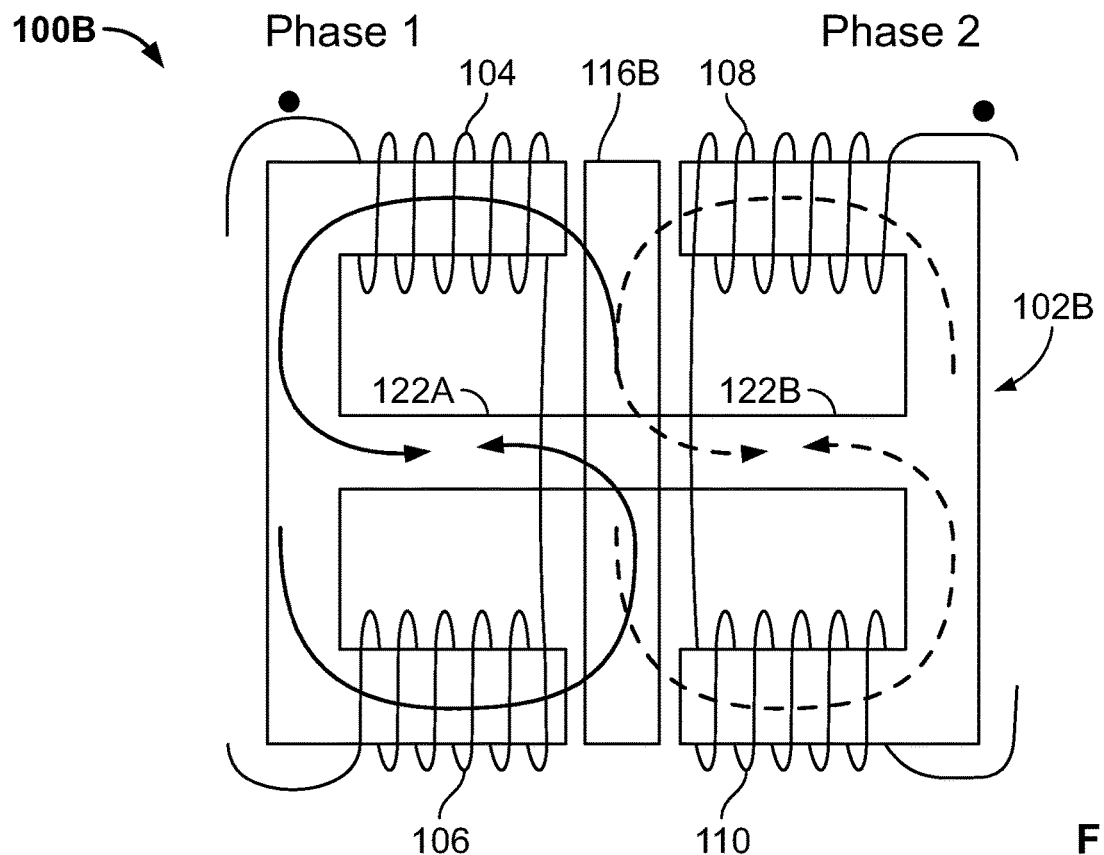
FIG. 7-10 are block diagrams of the transformer of FIG. 1C with magnetic flux generated from the current of FIG. 6, according to other example embodiments.
Figure 8:
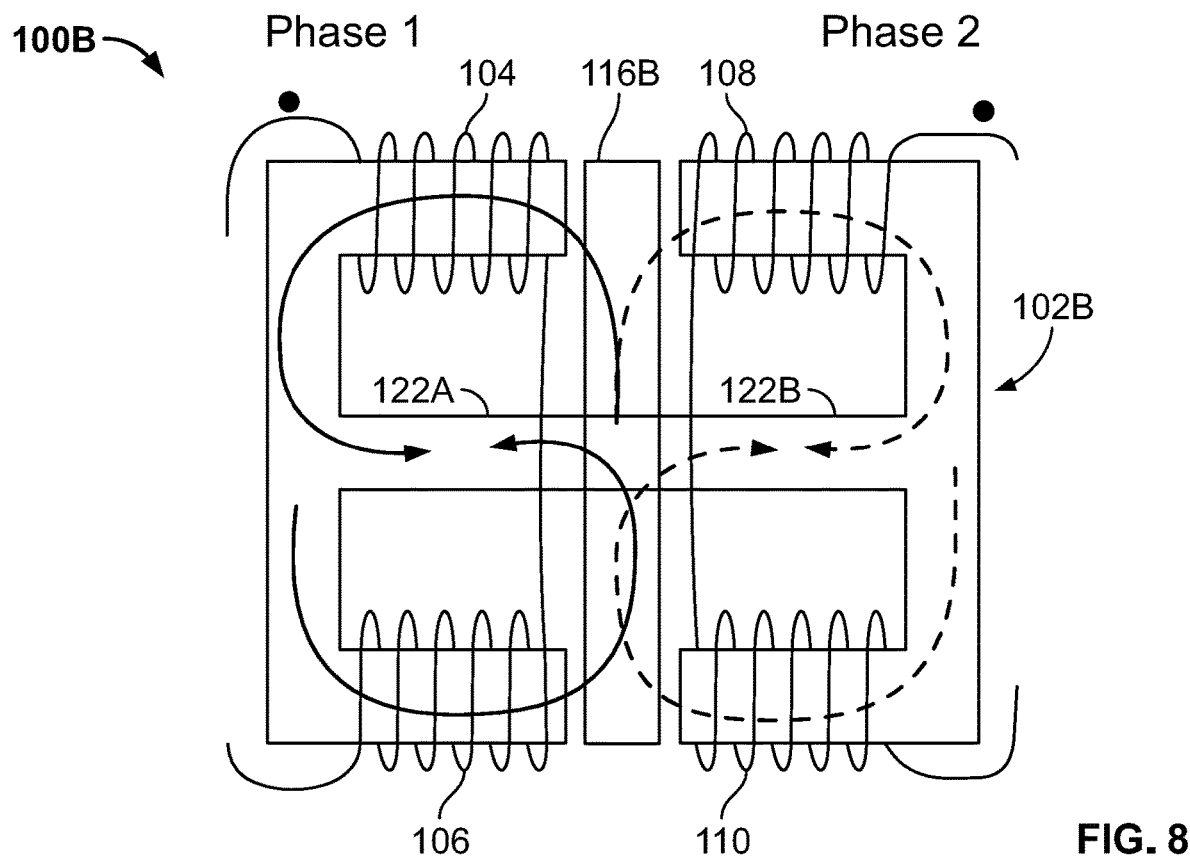
Figure 9:
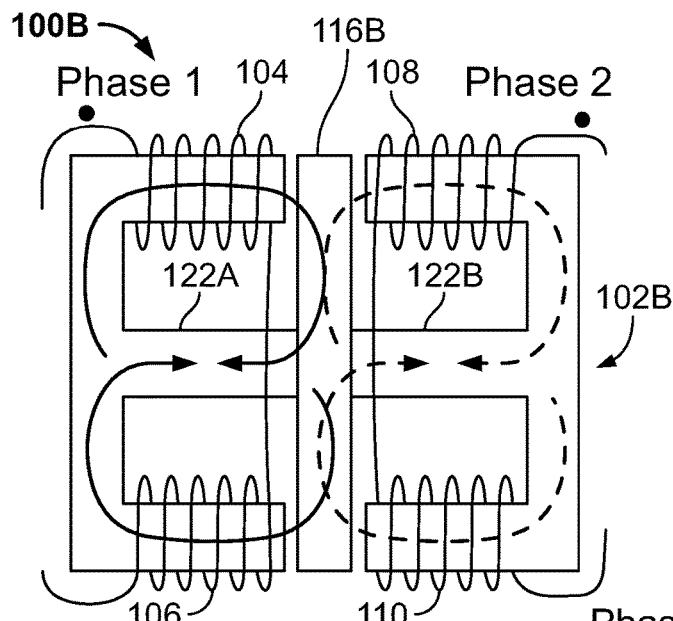
Figure 10:
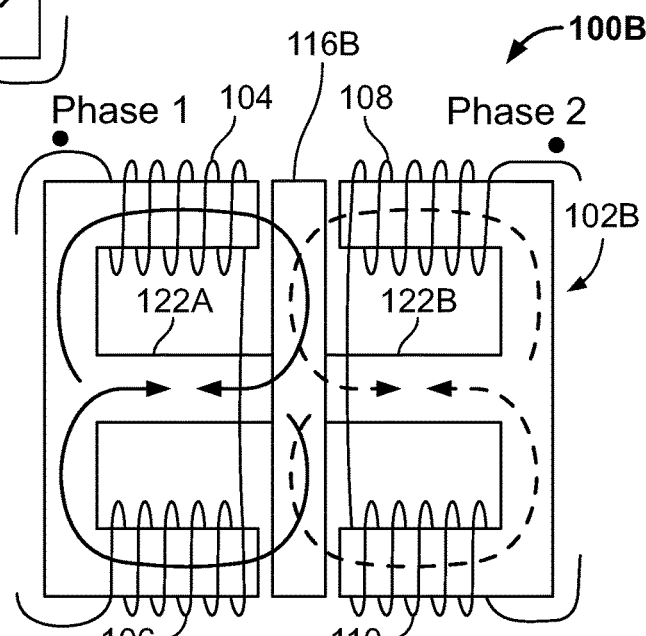

This current flow through the primary windings generates magnetic flux in the magnetic structure as explained above. For example, FIGS. 7-10 illustrate the transformer 100B of FIG. 1B in which the coils 104, 106, 108, 110 are energized thereby generating magnetic flux in the magnetic structure 102B based on the current flow shown in FIG. 5. Specifically, FIG. 7 illustrates the generated magnetic flux from time T0 to time T1, FIG. 8 illustrates the generated magnetic flux from time T1 to time T2, FIG. 9 illustrates the generated magnetic flux from time T2 to time T3, and FIG. 10 illustrates the generated magnetic flux from time T3 to time T4. FIG. 6 illustrates the generated flux in the middle member 116B of the transformer 100B.

With reference to FIGS. 5 and 7, the current flowing through the coils 104, 106 (Phase 1) is positive (+Im) between times T0, T1, and the current flowing through the coils 108, 110 (Phase 2) is negative (−Im) between times T0, T1. As a result, magnetic flux in the center legs 122A, 122B is cancelled, and magnetic flux in the middle member 116B ramps up as shown in FIG. 6.

With reference to FIGS. 5 and 8, the current flowing through the coils 104, 106, 108, 110 (Phases 1, 2) is positive (+Im) between times T1, T2. This causes magnetic flux in the center legs 122A, 122B to cancel. Additionally, and as shown in FIGS. 5, 6 and 8, magnetic flux in the middle member 116B adds together and remains substantially constant because the current waveform 500 is ramping down and the current waveform 502 is ramping up.

With reference to FIGS. 5 and 9, the current flowing through the coils 104, 106 (Phase 1) is negative (−Im), and the current flowing through the coils 108, 110 (Phase 2) is positive (+Im) between times T2, T3. As a result, magnetic flux in the center legs 122A, 122B is cancelled, and magnetic flux in the middle member 116B ramps down as shown in FIG. 6.

With reference to FIGS. 5 and 10, the current flowing through the coils 104, 106, 108, 110 (Phases 1, 2) is negative (−Im) between times T3, T4. This causes magnetic flux in the center legs 122A, 122B to cancel. Additionally, and as shown in FIGS. 5, 6 and 10, magnetic flux in the middle member 116B adds together and remains substantially constant because the current waveform 500 is ramping up and the current waveform 502 is ramping down.

Figure 11A:
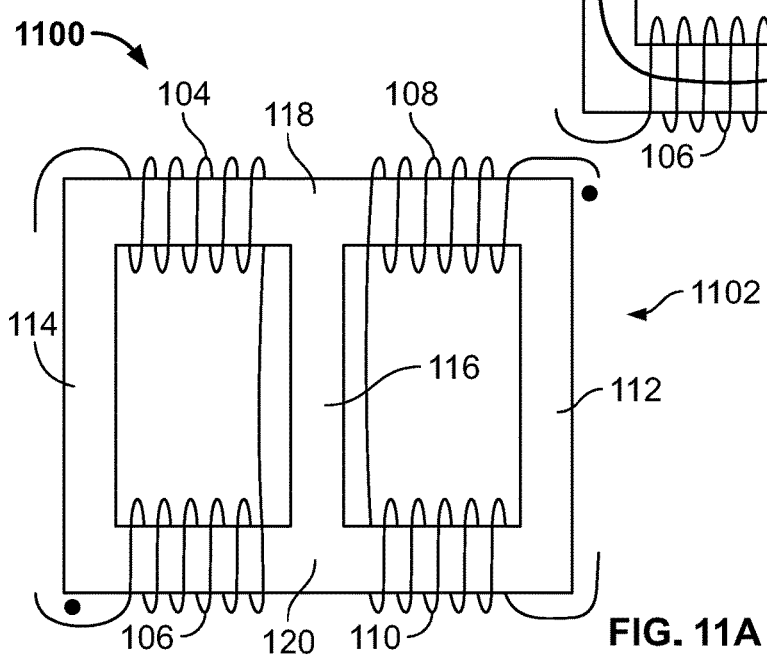
FIG. 11A is a transformer for a multiphase interleaved power converter including a magnetic structure having a U-I-U core configuration, and multiple sets of coils wound about outer legs of the magnetic structure, according to another example embodiment.

In some examples, the center legs 122, 122A, 122B of FIGS. 1A, 1B and 7-10 may be removed if magnetic flux in the leg(s) is completely cancelled as explained above. For example, FIG. 11A illustrates a transformer 1100 substantially is similar to the transformer 100 of FIG. 1A, but where its magnetic structure 1102 includes no center leg. Specifically, the magnetic structure 1102 of FIG. 1A includes the top member 112, the bottom member 114, the outer legs 118, 120, and the middle member 116 of FIG. 1A. As shown in FIG. 11A, the magnetic structure 1102 does not include a center leg positioned between the outer legs 118, 120.

In the particular example of FIG. 11A, the magnetic structure 1102 has a monolithic U-I-U core configuration. For example, the top member 112 and portions of the outer legs 118, 120 may form one U-shaped core, and the bottom member 114 and portions of the outer legs 118, 120 may form another U-shaped core. Additionally, the middle member 116 and/or portions of the outer legs 118, 120 may form an I-shaped core as explained above.

As shown, the transformer 1100 of FIG. 11A further includes the coils 104, 106, 108, 110 of FIG. 1A wound about the outer legs 118, 120 as explained above. In such examples, when the coils 104, 106 are energized, magnetic flux travels through the bottom member 114, a portion of the outer leg 118, the middle member 116, and a portion of the outer leg 120. Additionally, when the coils 108, 110 are energized, magnetic flux travels through the top member 112, a portion of the outer leg 118, the middle member 116, and a portion of the outer leg 120.

Figure 11B:
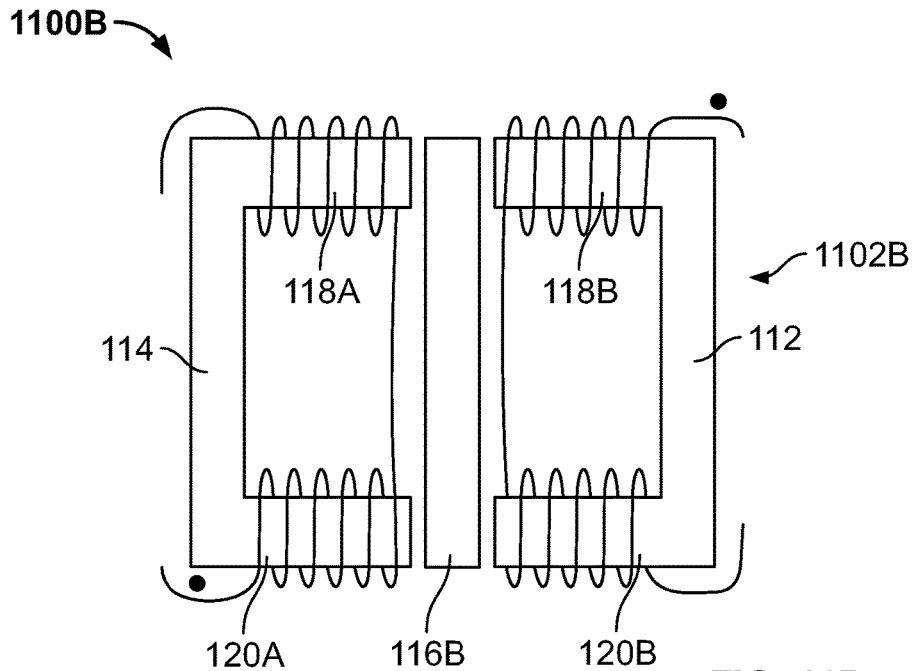
FIG. 11B is a transformer for a multiphase interleaved power converter including a magnetic structure similar to the magnetic structure of FIG. 11A, but including air gaps, according to another example embodiment.

Although not shown in FIG. 11A, the magnetic structure 1102 may optionally include one or more gaps (e.g., air gaps, etc.) to physically separate portions of the magnetic structure 1102. For example, FIG. 11B illustrates a transformer 1100B substantially similar to the transformers 100B, 1100 of FIGS. 1B and 11A, but having air gaps to physically separate portions of its magnetic structure 1102B and no center leg. Specifically, the transformer 1100B includes the members 112, 114, 116B and the outer legs 118A, 118B, 120A, 120B of FIG. 1B. As shown in FIG. 11B, the transformer 1100B includes an air gap between each outer leg 118A, 118B, 120A, 120B and the middle member 116B.

Figure 12:
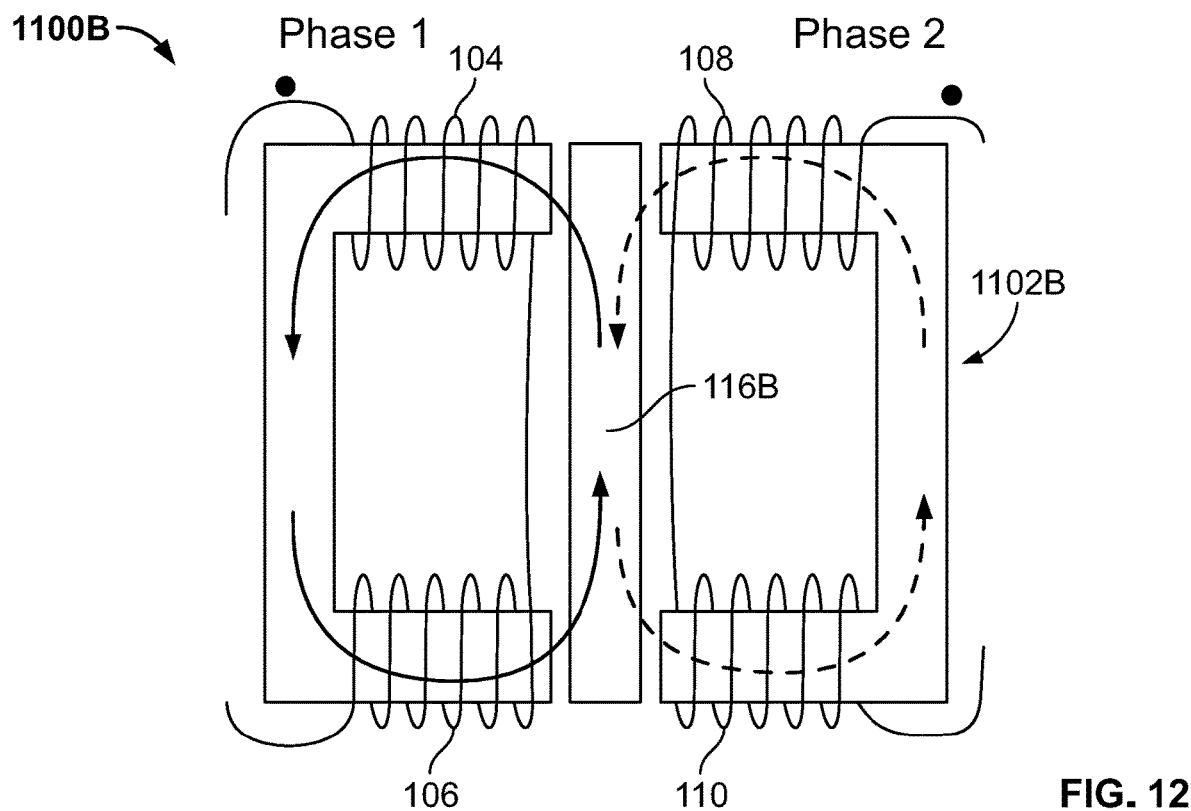
FIG. 12-15 are block diagrams of the transformer of FIG. 11B with magnetic flux generated from the current of FIG. 6, according to other example embodiments.
Figure 13:
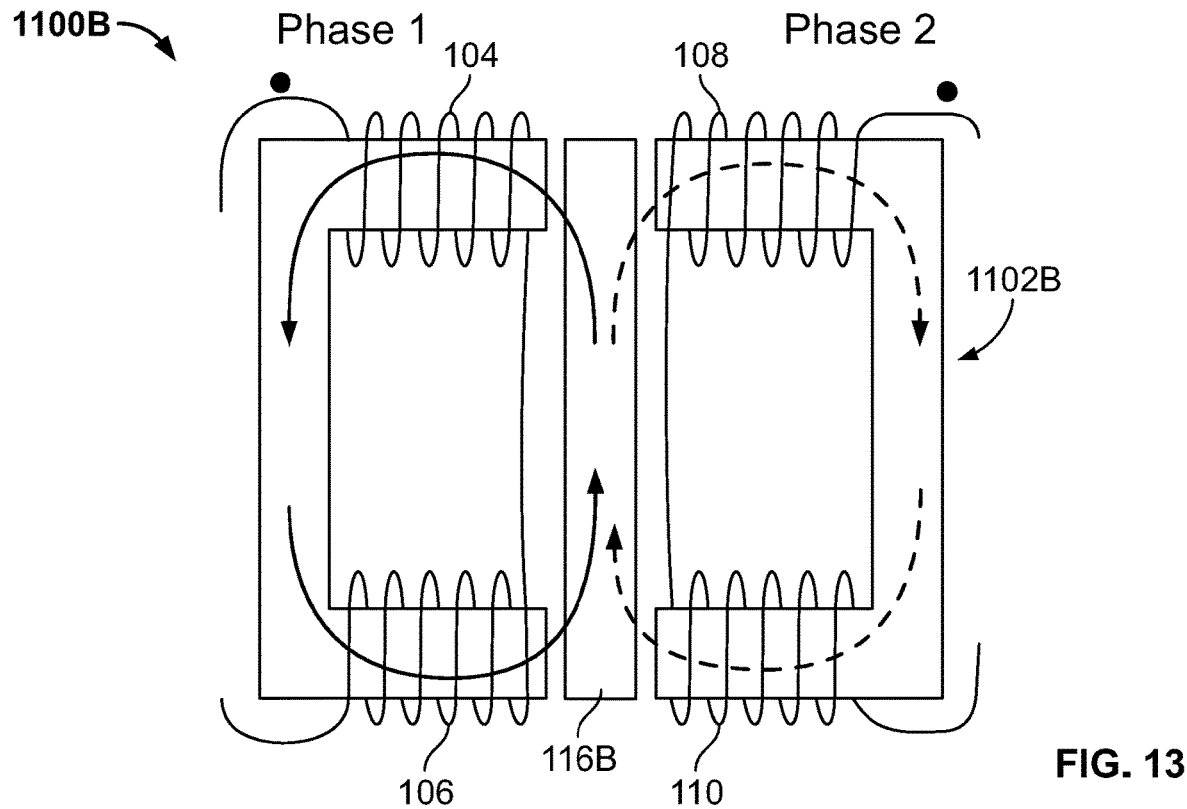
Figure 14:
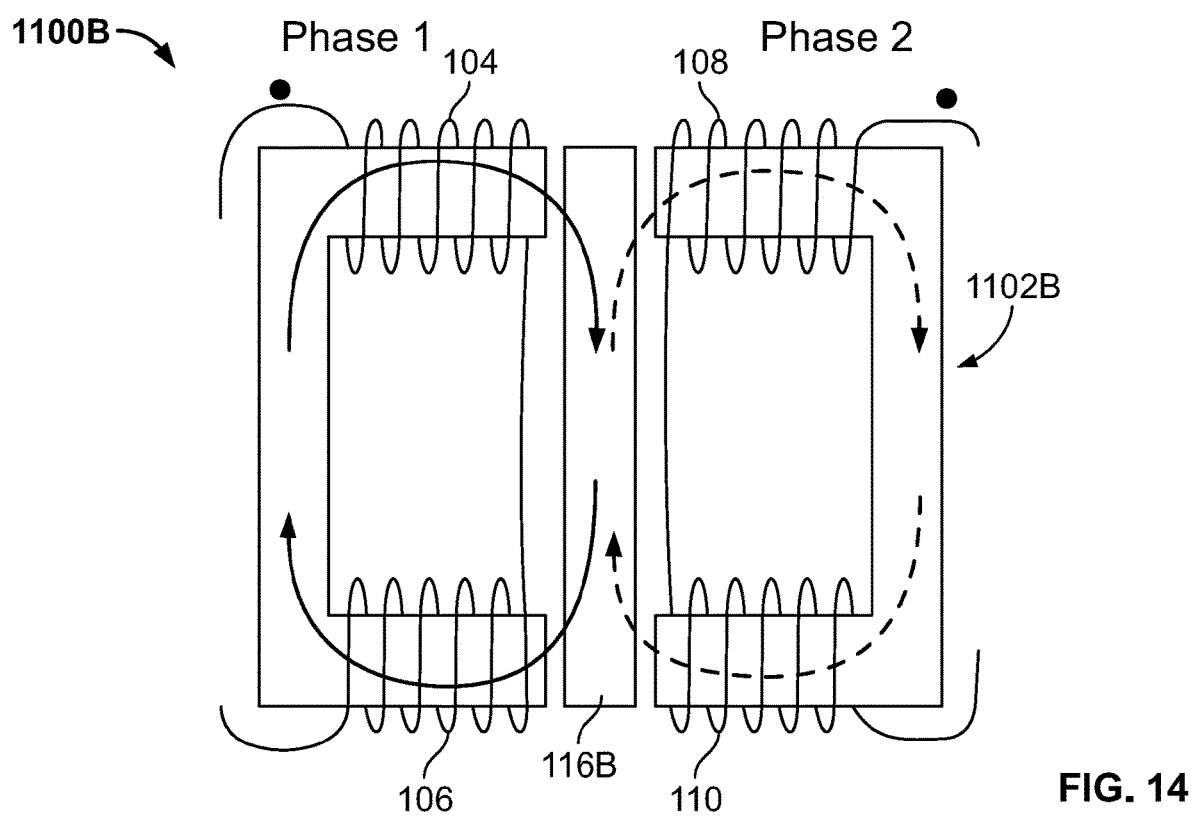
Figure 15:
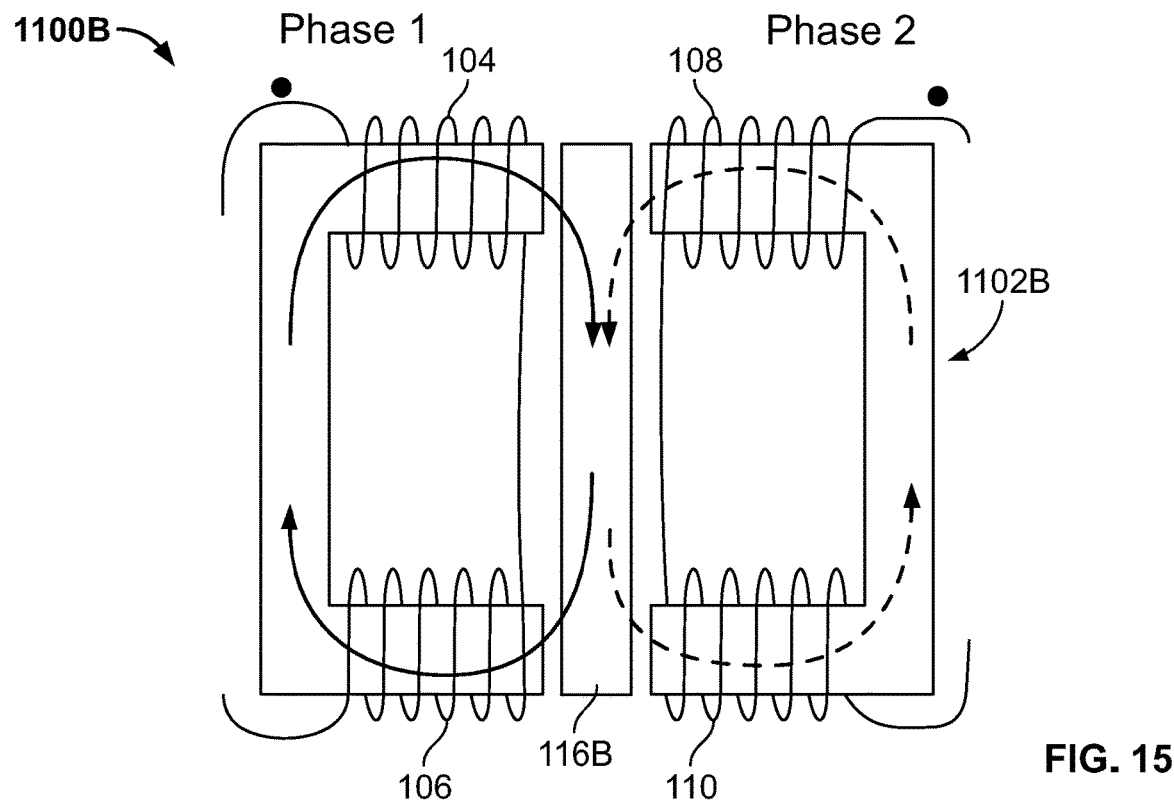

As explained above, current flow through the coils 104, 106, 108, 110 generates magnetic flux in the magnetic structure. For example, FIGS. 12-15 illustrate the transformer 110B of FIG. 11B in which the coils 104, 106, 108, 110 are energized thereby generating magnetic flux in the magnetic structure 1102B based on the current flow show in FIG. 5. Specifically, FIG. 12 illustrates the generated magnetic flux from time T0 to time T1, FIG. 13 illustrates the generated magnetic flux from time T1 to time T2, FIG. 14 illustrates the generated magnetic flux from time T2 to time T3, and FIG. 15 illustrates the generated magnetic flux from time T3 to time T4.

With reference to FIGS. 5 and 12, the current flowing through the coils 104, 106 (Phase 1) is positive (+Im) between times T0, T1, and the current flowing through the coils 108, 110 (Phase 2) is negative (−Im) between times T0, T1. As a result, magnetic flux in the middle member 116B ramps up as shown in FIG. 6.

The current flowing through the coils 104, 106, 108, 110 (Phases 1, 2) is positive (+Im) between times T1, T2. This causes magnetic flux in the middle member 116B to add together and remain substantially constant because the current waveform 500 is ramping down and the current waveform 502 is ramping up, as shown in FIGS. 5, 6 and 13.

With reference to FIGS. 5 and 14, the current flowing through the coils 104, 106 (Phase 1) is negative (−Im), and the current flowing through the coils 108, 110 (Phase 2) is positive (+Im) between times T2, T3. As a result, magnetic flux in the middle member 116B ramps down as shown in FIG. 6.

The current flowing through the coils 104, 106, 108, 110 (Phases 1, 2) is negative (−Im) between times T3, T4. This causes magnetic in the middle member 116B to add together and remain substantially constant because the current waveform 500 is ramping up and the current waveform 502 is ramping down, as shown in FIGS. 5, 6 and 15.

Figure 16:
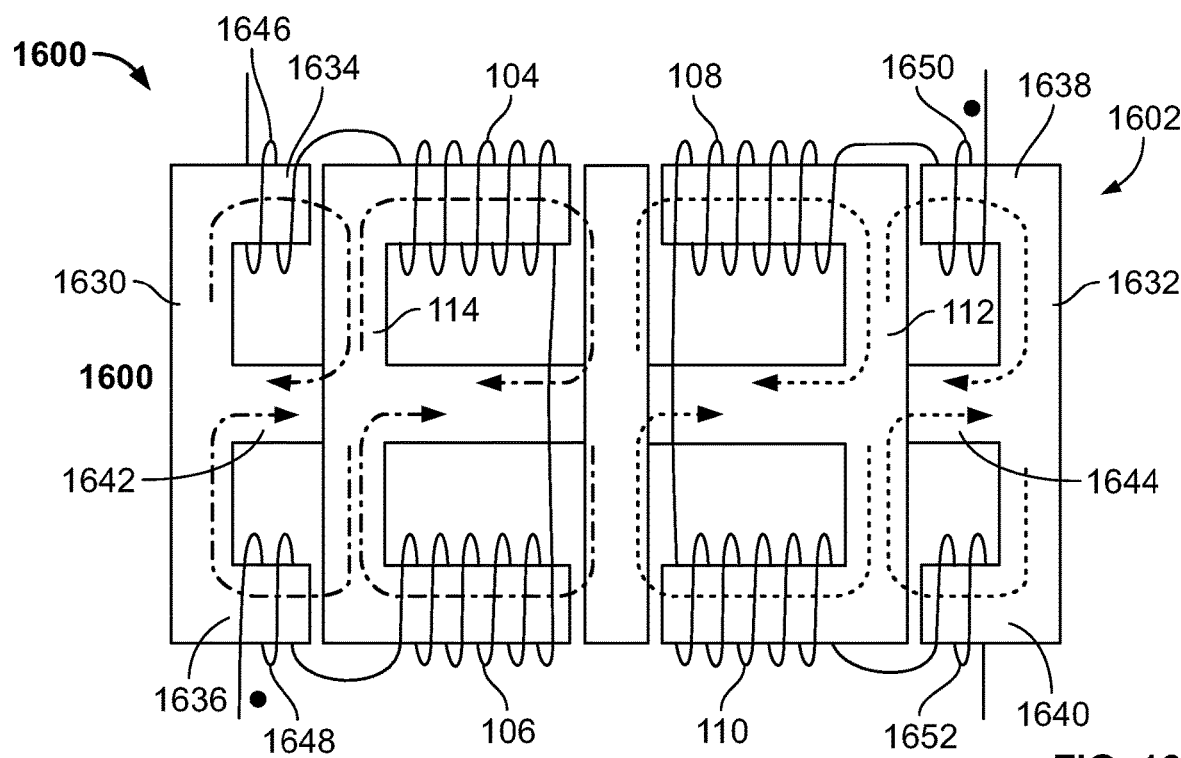
FIG. 16 is a block diagram of a transformer for a multiphase interleaved power converter including a magnetic structure having an E-E-I-E-E core configuration, according to another example embodiment.

In some examples, the magnetic structures disclosed herein may include members, legs, etc. for an inductor coil. For example, FIG. 16 illustrates a transformer 1600 similar to the transformer 100B of FIG. 1B, but including additional members, legs, etc. and coils for two resonant chokes. As shown in FIG. 16, the transformer 1600 includes a magnetic structure 1602 auxiliary members 1630, 1632, and auxiliary legs 1634, 1636, 1638, 1640, 1642, 1644 extending between the auxiliary members 1630, 1632 and the members 114, 112 of FIG. 1B. The auxiliary legs 1634, 1636, 1638, 1640 are outer legs, and the auxiliary legs 1642, 1644 are center legs. The magnetic structure 1602 of FIG. 16 forms an E-E-I-E-E core configuration.

The transformer 1600 further includes coils 1646, 1648, 1650, 1652 wound about the outer auxiliary legs 1634, 1636, 1638, 1640. The coils 1646, 1648, 1650, 1652 represent two resonant chokes. Specifically, the coils 1646, 1648 represent one resonant choke in one phase, and the coils 1650, 1652 represent another resonant choke in another phase.

As shown in FIG. 16, the coil 1646 is coupled to the coil 104, the coil 1648 is coupled to the coil 106, the coil 1650 is coupled to the coil 108, and the coil 1652 is coupled to the coil 110. With this configuration, the coils 1646, 104, 106, 1648 are electrically coupled in series, and the coils 1650, 108, 110, 1652 are electrically coupled in series. This ensures the same amount of current passes through the coils 1646, 104, 106, 1648, and the same amount of current passes through the coils 1650, 108, 110, 1652. As a result, magnetic flux in the center auxiliary legs 1642, 1644 cancels as explained above. Additionally, magnetic flux may cancel in portions of the members 112, 114 as shown in FIG. 16.

Figure 17:
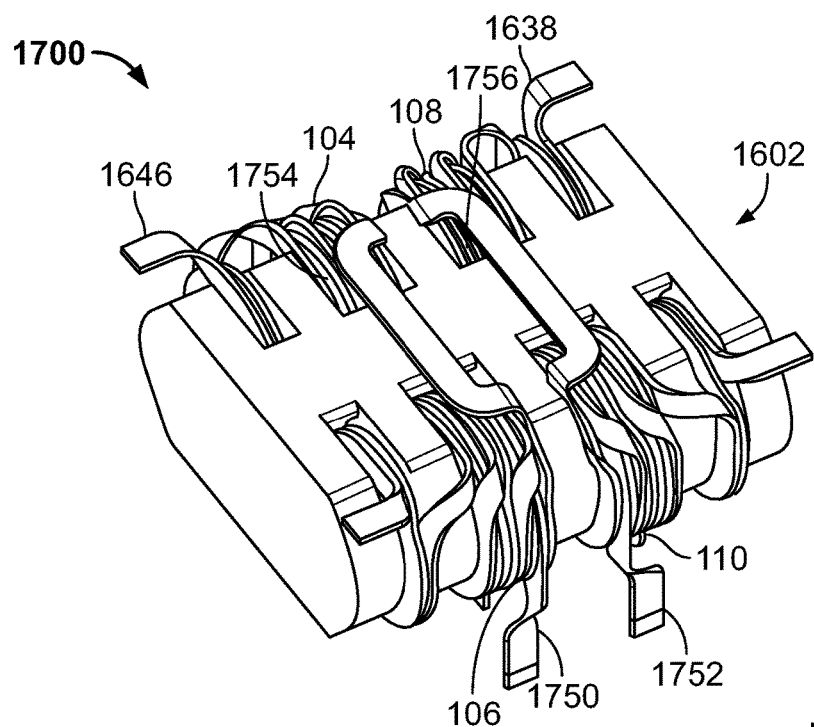
FIG. 17 is an isometric view of the transformer of FIG. 16 according to yet another example embodiment.

FIG. 17 illustrates a transformer 1700 including the magnetic core 1602 and the coils 104, 106, 108, 110, 1646, 1648, 1650, 1652 of FIG. 16. Additionally, the transformer 1700 includes coils 1750, 1752, 1754, 1756 wound about similar outer legs as the coils 104, 106, 108, 110. In the particular example of FIG. 17, the coils 104, 106, 108, 110 represent two sets of primary windings for two different phases in a two-phase interleaved LLC power converter, the coils 1750, 1752, 1754, 1756 represent two sets of secondary windings for the different phases, and the coils 1646, 1648, 1650, 1652 represent two resonant chokes for the different phases.

In the particular example of FIG. 17, the coils are plate windings. In other examples, other suitable types of coils may be employed such as conductive wire, etc.

Figure 18A:
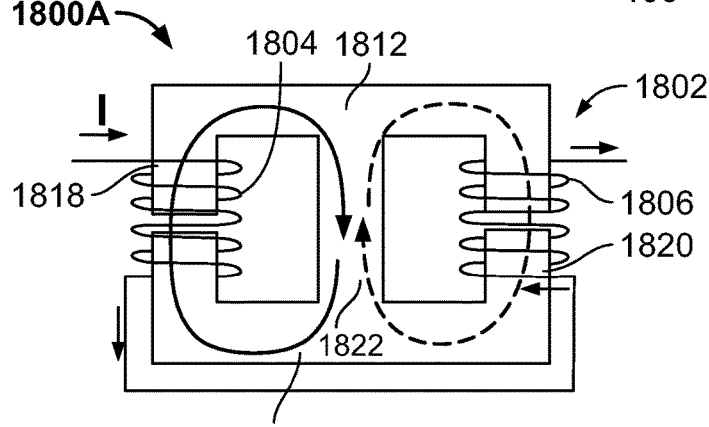
FIG. 18A is a transformer for a single-phase power converter including a magnetic structure having an E-E core configuration and a set of coils wound about outer legs of the magnetic structure, according to another example embodiment.

In some examples, the teachings disclosed herein may be applied to single-phase power converters as explained above. For example, FIG. 18A illustrates a transformer 1800A for a single-phase power converter. As shown in FIG. 18A, the transformer 1800A includes a magnetic structure 1802 and coils 1804, 1806 electrically coupled in series. The magnetic structure 1802 includes a top member 1812, a bottom member 1814, and legs extending between the top member 1812 and the bottom member 1814. The legs include two outer legs 1818, 1820 and a center leg 1822. In the some embodiments, the top member 1812, the bottom member 1814, and the legs 1818, 1820, 1822 may form an E-E core configuration.

As shown in FIG. 18A, the coils 1804, 1806 wound about the outer legs 1818, 1820. No coils are wound on the center leg 1822.

When the coils 1804, 1806 are energized, magnetic flux is generated in the magnetic structure 1802. Specifically, magnetic flux generated by the coil 1804 circulates in portions of the members 1812, 1814, the outer leg 1818 and the center leg 1822. Additionally, magnetic flux generated by the coil 1806 circulates in portions of the members 1812, 1814, the outer leg 1820 and the center leg 1822.

As shown in FIG. 18A, the magnetic flux from the coils 1804, 1806 may cancel in the center leg 1822. For example, the magnetic flux from the coil 1804 flows in the opposite direction as the magnetic flux from the coil 1806 in the center leg 1822 causing the fluxes to cancel out.

Figure 18B:
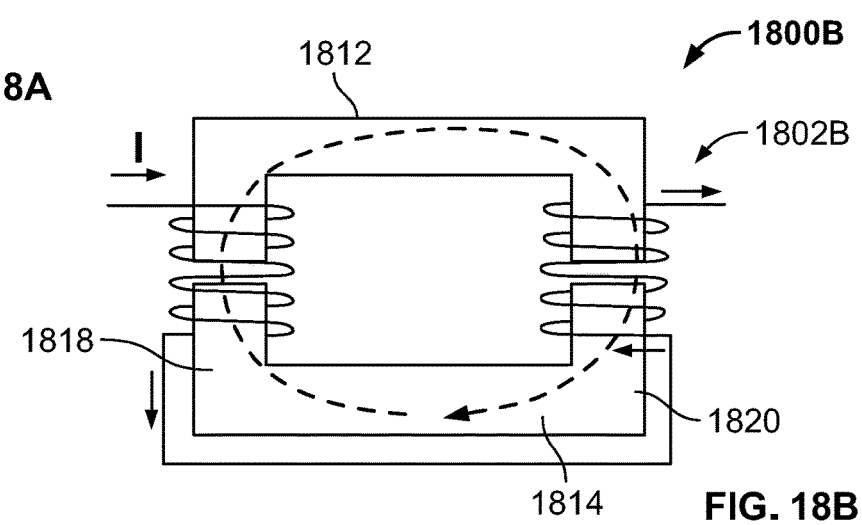
FIG. 18B is a transformer for a single-phase power converter including a magnetic structure and a set of coils wound about outer legs of the magnetic structure, according to another example embodiment.

In some embodiments, the magnetic flux in the center leg 1822 may completely cancel out due to, for example, the series connection between the coils 1804, 1806 as explained herein. In such examples, the center leg 1822 may be removed. For example, FIG. 18B illustrates a transformer 1800B substantially similar to the transformer 1800A of FIG. 18A, but including a magnetic structure 1802B not having a center leg between its members 1812, 1814. In such examples, magnetic flux generated in the magnetic structure 1802B circulates in the members 1812, 1814 and the outer legs 1818, 1820, as shown by the dashed line in FIG. 18B.

The secondary side switching circuits disclosed herein may include any suitable rectification component and/or topography. For example, the rectifying circuits may include diode rectifying circuits as shown in FIGS. 3 and 4. The diode rectifying circuits each may be a full-wave bridge rectifying circuit, a half-wave bridge rectifying circuits or another suitable rectifying circuit. In other examples, the rectifying circuits may include power switches (e.g. MOSFETs, etc.) in addition to and/or alternative to diodes.

Additionally, the primary side switching circuits may include one or more switching devices arranged in any suitable topography. For example, the primary side switching circuits may include two power switches (MOSFETs) arranged in a half-bridge topography as shown in FIGS. 3 and 4. In other examples, the switching circuits may include another suitable switching device arranged in a half-bridge topography, a full-bridge topography, etc. Further, the switching devices may include MOSFETs other suitable transistors, diodes, etc. In some examples, gallium nitride (GaN) semiconductor switching devices may be employed.

As explained above, the magnetic structures disclosed herein achieve cancellation of magnetic flux in portions of the structures. As a result, power converters such as single-phase power converters or multiphase phase power converters (e.g., two-phase interleave power converters) employing the magnetic structures may have a reduced core volume as compared to conventional power converters. In turn, core losses may be less and efficiency in the power converters may be higher as compared to conventional power converters. For example, testing has shown that some two-phase interleaved power converters may reach an efficiency of about 99% when the magnetic structures disclosed herein are employed. Additionally, costs associated with the two-phase interleaved power converters is less than conventional power converters.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A transformer for a multiphase interleaved power converter, the transformer comprising:
   a magnetic structure including a top member, a bottom member, a plurality of legs extending between the top member and the bottom member, the plurality of legs including two outer legs, and a middle member positioned between the top member and the bottom member and extending between the two outer legs;
   a first set of coils wound about the two outer legs of the magnetic structure between the top member and the middle member and electrically coupled in series; and
   a second set of coils wound about the two outer legs of the magnetic structure between the bottom member and the middle member and electrically coupled in series;
   wherein the magnetic structure includes a center leg positioned between the two outer legs;
   wherein no coil is wound about the center leg; and
   wherein magnetic flux generated from the first set of coils is cancelled in a portion of the center leg between the top member and the middle member.

2. The transformer of claim 1 wherein magnetic flux generated from the second set of coils is cancelled in a portion of the center leg between the bottom member and the middle member.

3. The transformer of claim 1 wherein the first set of coils includes a first coil wound about one of the two outer legs and a second coil wound about the other one of the two outer legs.

4. The transformer of claim 1 wherein the two outer legs each include a first portion and a second portion, wherein the first set of coils includes a first coil wound about the first portion of one of the two outer legs and a second coil wound about the first portion of the other one of the two outer legs, and wherein the second set of coils includes a first coil wound about the second portion of said one of the two outer legs and a second coil wound about the second portion of the other one of the two outer legs.

5. A transformer comprising:
   a magnetic structure including a top member, a bottom member, and a plurality of legs extending between the top member and the bottom member, the plurality of legs including two outer legs, and a middle member positioned between the top member and the bottom member and extending between the two outer legs; and a pair of coils wound about the two outer legs of the magnetic structure and electrically coupled in series;

wherein the pair of coils comprises:
- a first coil wound about a first outer leg of the two outer legs between the top member and the middle member; and
- a second coil wound about a second outer leg of the two outer legs between the top member and the middle member;

wherein the magnetic structure includes a center leg positioned between the two outer legs;

wherein no coil is wound about the center leg;

wherein no gap physically separates any portion of the magnetic structure; and wherein, when the set of coils are energized, magnetic flux generated from the pair of coils is cancelled in a portion of the center leg between the top member and the middle member.

6. A multiphase interleaved power converter comprising a plurality of phases and a transformer for the plurality of phases, the transformer including:

a magnetic structure comprising:
- a top member;
- a bottom member;
- a plurality of legs extending between the top member and the bottom member, the plurality of legs including two outer legs;
- a middle member positioned between the top member and the bottom member and extending between the two outer legs;
- a first set of coils wound about the two outer legs of the magnetic structure between the top member and the middle member and electrically coupled in series; and
- a second set of coils wound about the two outer legs of the magnetic structure between the bottom member and the middle member and electrically coupled in series;

wherein the magnetic structure includes a center leg positioned between the two outer legs;

wherein no coil is wound about the center leg; and wherein magnetic flux generated from the first set of coils is cancelled in a portion of the center leg between the top member and the middle member.

7. The multiphase interleaved power converter of claim 6 wherein the plurality of phases includes a first phase and a second phase, wherein the first set of coils are primary windings or secondary windings in the first phase, and wherein the second set of coils are primary windings or secondary windings in the second phase.

8. The multiphase interleaved power converter of claim 7 wherein the first phase is phased shifted ninety-degree relative to the second phase.

9. The multiphase interleaved power converter of claim 6 wherein the multiphase interleaved power converter is a two-phase interleaved LLC power converter.

10. The multiphase interleaved power converter of claim 6 wherein the first set of coils includes at least a first coil wound about one of the two outer legs and a second coil wound about the other one of the two outer legs.

11. The multiphase interleaved power converter of claim 6 wherein magnetic flux generated from the second set of coils is cancelled in a portion of the center leg between the bottom member and the middle member.

12. The multiphase interleaved power converter of claim 6 wherein the two outer legs each include a first portion and a second portion, wherein the first set of coils includes a first coil wound about the first portion of one of the two outer legs and a second coil wound about the first portion of the other one of the two outer legs, and wherein the second set of coils includes a first coil wound about the second portion of said one of the two outer legs and a second coil wound about the second portion of the other one of the two outer legs.

* * * * *